United States Patent

[11] 3,551,668

| | | |
|---|---|---|
| [72] | Inventor | Charles Rivolier<br>Paris |
| [21] | Appl. No. | 671,019 |
| [22] | Filed | Sept. 27, 1967 |
| [45] | Patented | Dec. 29, 1970 |
| [73] | Assignee | Societe Anonyme D.B.A. |
| [32] | Priority | Oct. 4, 1966, Dec. 16, 1966 |
| [33] | | France |
| [31] | | Nos. 78,675 and 87,780 |

[54] HEADLIGHT ADJUSTING SYSTEM
9 Claims, 4 Drawing Figs.

[52] U.S. Cl. ............................................ 240/61.1,
240/7.1, 240/41.62, 240/62.3
[51] Int. Cl. .................................................. B60g 1/06
[50] Field of Search ........................................... 240/7.1,
41.62, 61.1, 62.3

[56] References Cited
UNITED STATES PATENTS

| | | | |
|---|---|---|---|
| 2,250,734 | 7/1941 | Thompson et al. ........... | 240/62.3 |
| 3,402,287 | 9/1968 | Hindman ...................... | 240/7.1 |
| 3,453,424 | 7/1969 | Cibie ............................ | 240/61.1X |

Primary Examiner—John M. Horan
Assistant Examiner—Richard L. Moses
Attorneys—R. G. Geib and Plante, Cerstvik, Arens and Killman ABSTRACT: An automatic automobile headlight-positioning system is provided with a fluid actuator which has a plurality of stable balanced positions to provide discrete levels of angular adjustment. The system utilizes a fluid pressure differential control to sense vehicle load by sensing depression of the body of the vehicle relative to the chassis. The fluid pressure within the chamber is thus a function of the load of the vehicle. By communicating the fluid pressure to an actuator at the headlights of the vehicle, the angular relationship between the headlights and the vehicle body may be varied to provide a substantially uniform angular relationship between the headlights and the chassis, regardless of vehicle load. The actuator is provided with a plurality of nested pistons of increasing diameter which provide a sequence of discrete adjustment positions so that minor variations in load will not cause the angular relationship of the headlights (with respect to the vehicle body) to vary.

HEADLIGHT ADJUSTING SYSTEM

This invention relates to an automatic control system for controlling the angular position of the headlights of a vehicle according to the trim of the latter.

Due to the elasticity of the suspension in modern cars it appeared necessary to modify the angular position of the headlights of the vehicle upon variation of the load thereof as well as upon variation of the distribution of the load between the rear and front axles for a given vehicle It has been already proposed control devices either manual, (the control operation being made by the driver) or automatic, (the control operation being effected by control means responsive to the trim of the vehicle).

More particularly the main object of the present invention is to provide an automatic control system of the type comprising actuator means operatively connected to the headlights to modify the angular position thereof according to a differential control pressure supplied by control means as a function of the trim of the vehicle sensed by said control means said device being characterized in that said actuator means comprise at least one pressure-responsive movable element operative to control the angular position of the headlights and adapted to be biased into one or the other of two positions of steady equilibrium for each of which said element is provided with a predetermined effective area subjected to said differential control pressure acting on said element against the force of preloaded resilient means.

Another object of the invention is to provide an automatic control system of the kind set hereinabove wherein said control means supplying said differential control pressure comprise at least one pneumatic piston-cylinder assembly the two relatively movable elements of which are connected to a fixed portion of the vehicle and to one axle thereof respectively to supply a pneumatic pressure varying as a function of the distance between the said axle and the chassis or body of the vehicle.

Still another object of the invention is to provide an automatic control system as set hereinabove wherein each pressure-responsive movable element is operative to control a hydraulic fluid pressure controlling the position of spring-loaded piston means operatively connected to the headlights to angularly move the same.

Other objects and advantages will become apparent from the following description taken in connection with the accompanying drawings wherein.

Figure 1:
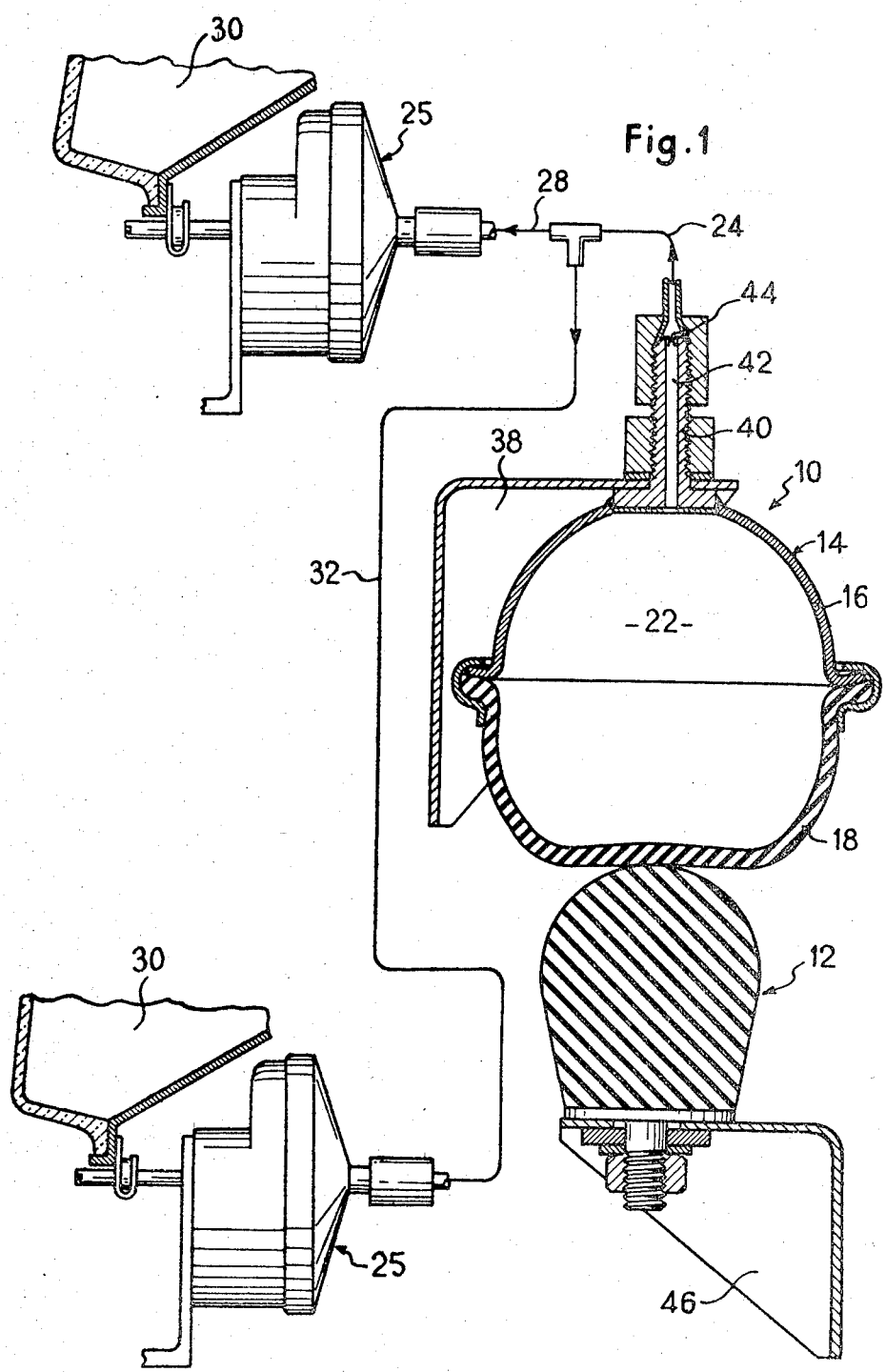
FIG. 1 is a diagrammatic view of an automatic control system according to the invention.
Figure 2:
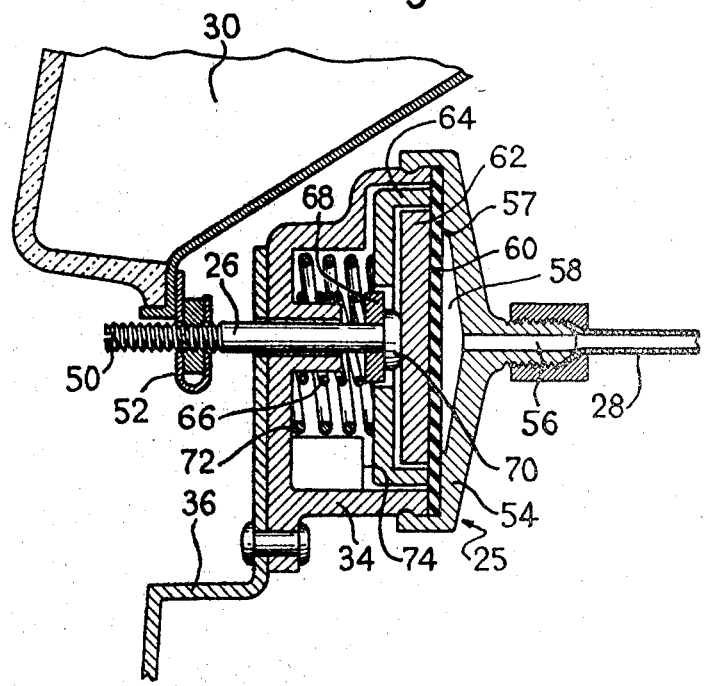
FIG. 2 is a cross-sectional view of actuator means diagrammatically shown in the control system of FIG. 1.

Referring now to FIGS. 1 and 2, there is illustrated an automatic control system including a control piston-cylinder assembly 10 and two actuator means 25 controlled by assembly 10 to define the angular position of the headlights 30 of a vehicle (not shown). Assembly 10, as shown in FIG. 1, substantially comprises a piston 12 and a cylinder 14 movable with respect to one another. Cylinder 14 is comprised of a rigid bell-shaped casing 16 and an elastomeric diaphragm 18, the outer edge of which is sealingly secured to the outer edge of the bell-shaped casing 16 by a crimped flange 20. The casing 16 and the diaphragm 18 define an internal variable volume chamber 22 filled with a fluid such as air. The cylinder 14 is secured by a fitting member 40 to a support 38 fixedly secured to the vehicle body or chassis. The piston 12 made of semielastomeric material for instance is secured to a movable support 46 suitably connected to a given member of the suspension to be actuated by a given axle of the vehicle (not shown). The fitting member 40 is provided with a passage 42 comprising a restrictive flow area orifice 44. The chamber 22 is fluidtightly connected to the actuator means 25 by passage 42, an outlet conduit 24 and two transmitting conduits 28 and 32. When the diaphragm 18 is in its rest position corresponding to the unload condition of the vehicle, the pressure in the internal chamber 22 is substantially equal to or slightly greater than the atmospheric pressure. Upon variation of the distance between the vehicle chassis and the axle, due to a variation of the load applied to the axle resulting from a variation of the trim of the vehicle, the diaphragm 18 is urged inwardly into casing 16 by piston 12 and the pressure in chamber 22 increases accordingly to cause a control actuation of the actuator means 25, after the pressure variation has been damped by orifice 44.

Each actuator means 25, as seen in FIG. 2, comprises a casing 34 suitably secured to a support 36 connected to the vehicle body or chassis. An output control member or rod 26 axially movable with respect to the casing 36 is threaded at its free end 50 to be adjustably secured to a lug 52 solid with the casing of the headlight 30. This latter is pivotally mounted on support 36 so that axial displacement of lug 52 actuated by the output member 26 results in a suitable angular displacement of the headlight 30.

The casing 34 is closed by a cover member 54 provided with an axial inlet passage 56 sealingly connected to transmitting conduit 28 (or 32). An elastomeric diaphragm 60 is sealingly pressed at its periphery between casing 34 and cover 54. In its normal rest position the diaphragm 60 is in engagement with the internal surface of cover 54 except with the central portion thereof which is defined by a circular recess 57 provided in the cover 54 and having a given diameter. The diaphragm 60 thus defines in combination with cover 54 an inlet control chamber 58 connected by the inlet passage 56 to the chamber 22 via conduits 28 (or 32) and 24, while the interior of casing 34 is connected to the atmosphere. A first piston member 62 having the shape of a circular plate and a second piston member 64 coaxially arranged in casing 34 to abut against the face of diaphragm 60 which is not subjected to the control pressure in chamber 58. A preloaded spring 66 is compressed between the bottom of casing 34 and a spring retainer 68 engaging an enlarged head 70 provided at the free end of the control member 26. The head 70 engages piston 62 to urge this latter against the face of the diaphragm 60 which is not subjected to the control pressure in chamber 58. The diameter of piston 62 is substantially greater than the diameter of the recess 57 so that diaphragm 60 is urged by piston 62 in sealing engagement with the outer edge of the recess 57. A second preloaded spring 72 is compressed between the bottom of casing 34 and the second piston 64 to urge this latter away from a shoulder 74 provided in casing 34 to abut the outer edge of diaphragm for biasing same in sealing engagement with the cover 54. It should be noted that there are a given radial play as well as a predetermined axial clearance between the two pistons 62 and 64, so that piston 62 can move toward the left as viewed in FIG. 2 to abut piston 64 while the diaphragm 60 remains in sealing engagement with cover 54 at the portion thereof adjacent the outer edge of piston 64. In the same manner a given radial play is provided between piston 64 and the sidewall of housing 34 and a predetermined axial clearance exists between said piston 64 and the abutment shoulder 74. The sum of the two axial clearances as defined hereinabove define the maximum stroke of the control member 26 and thus the maximum angular displacement of headlights 30.

The operation of the system described hereinabove is as follows:

It will be first assumed that in the condition of minimum load, i.e. with only the driver and a little quantity of fuel in the vehicle reservoir, the angular position of the headlights has been adjusted to "legal" or normal setting; the diaphragm 18 is not substantially depressed by piston 12, the pistons 62 and 64 remaining in their normal or rest position shown in FIG. 2.

Upon a variation of the trim of the vehicle causing an increase of the load acting upon the corresponding axle and thus the relative displacement of this latter with respect to the vehicle body, piston 12 is biased toward the interior of casing 16 and depresses the diaphragm 18. The internal volume of chamber 22 decreases causing an increase of the fluid pressure in the system, the pressure in chamber 58 increasing at a low rate due to the restrictive orifice 44. When the pressure in chamber 58, which acts on the effective area of diaphragm 60 as defined by recess 57, exceeds a predetermined value, the force of spring 66 is overcome. Piston 62 moves toward the left as viewed in FIG. 2 and allows the diaphragm 60 to disengage the edge of recess 57. The effective pressure responsive area of piston 62 suddenly increases and the latter piston is then urged in a snap action in abutment against the second piston 64. The piston 62 will remain in this position as long as the pressure in chamber 58 is above a second predetermined value lower than the first-named predetermined value as it will be understood by anyone skilled in the art. Displacement of piston 62 results in a corresponding change of the angular position of headlights 30 to compensate for the above variation of the trim of the vehicle.

Upon further increase of the pressure in chamber 22 above this first value resulting from a further increase of the axle load, the pressure in chamber 58 increases accordingly with of course the time delay introduced by orifice 44. If the pressure in chamber 58 reaches a third predetermined value high enough to overcome the forces of spring 66 and spring 72 when acting substantially on the effective pressure responsive area of piston 62 in engagement with piston 64, the pistons 62 and 64 move as a unit toward the left (as viewed in FIG. 2) thus allowing the annular surface adjacent to the outer edge of piston 64 to disengage the cover 54. This increment of effective area results in a snap displacement of the piston assembly 62—64 until the latter abuts the shoulder 74, thereby positioning the headlights 30. The piston assembly 62—64 will remain in abutment against shoulder 74 as long as the control pressure in chamber 58 will remain above a fourth predetermined value lower than the third value but greater than the first-named value. It will be clearly understood that the actuator 25 may comprise a plurality of pistons and preloaded springs such as piston 64 and spring 72, each piston defining a given steady equilibrium position of the control member 26 controlling the angular position of the headlights.

Figure 3:
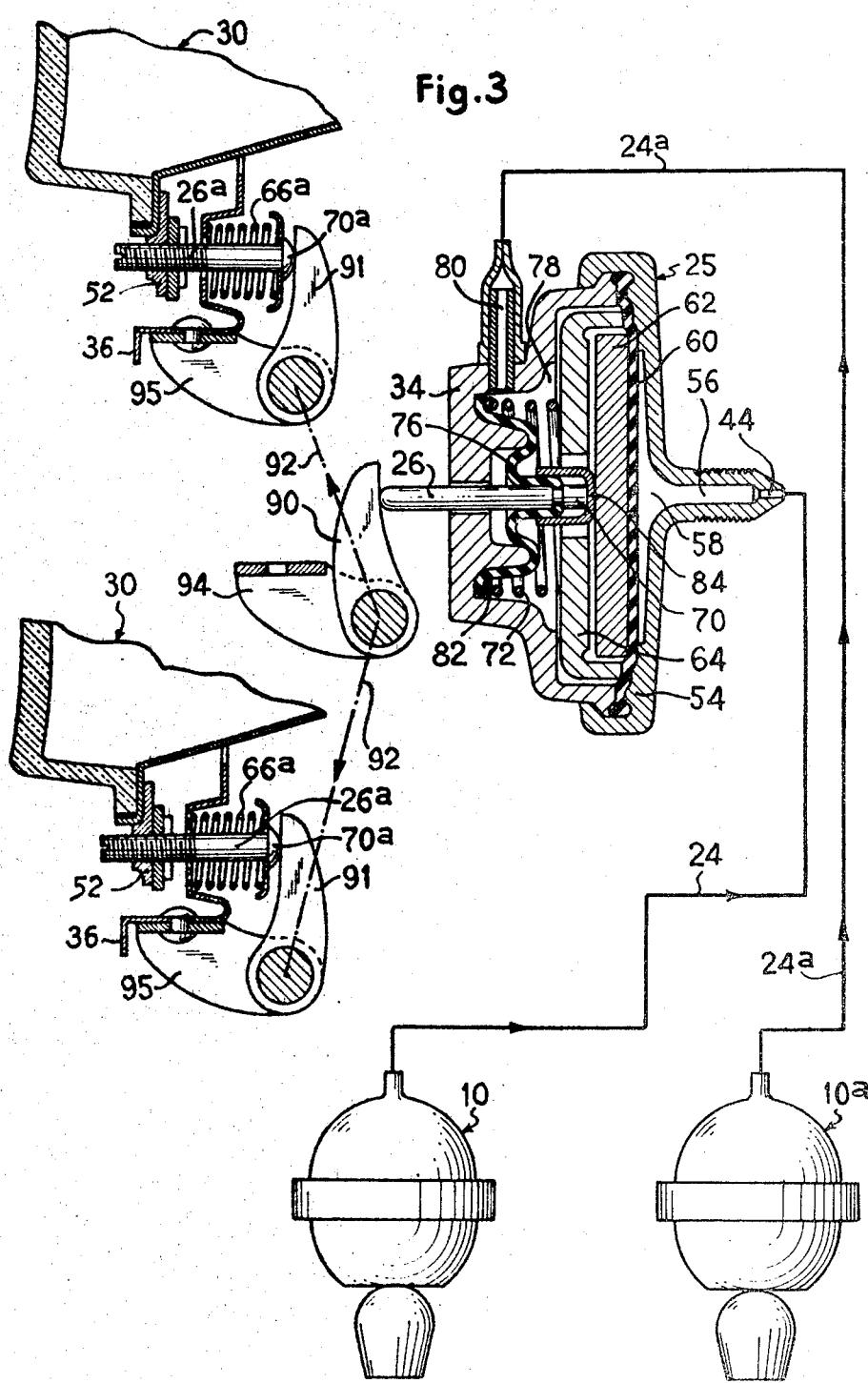
FIG. 3 is a diagrammatic view of a second embodiment of an automatic control system according to the invention.

FIG. 3 describes a second embodiment of a control system which is similar to the one described hereinabove. The main difference consists of a differential pressure action on the diaphragm 60 and pistons 62 and 64. The actuator 25 is provided with a sealing boot 76 sealingly secured to casing 34 by means of a washer 82 and to the head 70 by means of a cup 84. The sealing boot 76 defines in combination with diaphragm 60 a second inlet chamber 78 which is connected to a passage 80 leading through a conduit 24a to a second control piston cylinder assembly 10a actuated by another axle than the one corresponding to the first assembly 10. The outlet control member 26 is thus positioned as a function of a differential control pressure corresponding only to a variation of the ratio of the loads applied to their respective axle. It is also to be noticed that the control member 26 is adapted to rotate a cam 90 suitably connected to a shaft indicated in phantom line at 92 which is rotatably mounted on fixed bearing members 94 and 95 to actuate levers 91. The levers 91 are engaged by the enlarged heads 70a of the respective control rods 26a under the action of compression springs 66a located between the support 36 and the heads 70a. Via shaft 92 cam 90 and control member 26, the springs 66a urge the piston 62 against the diaphragm 60 which sealingly engages the stepped inner surface of the cover 54.

Figure 4:
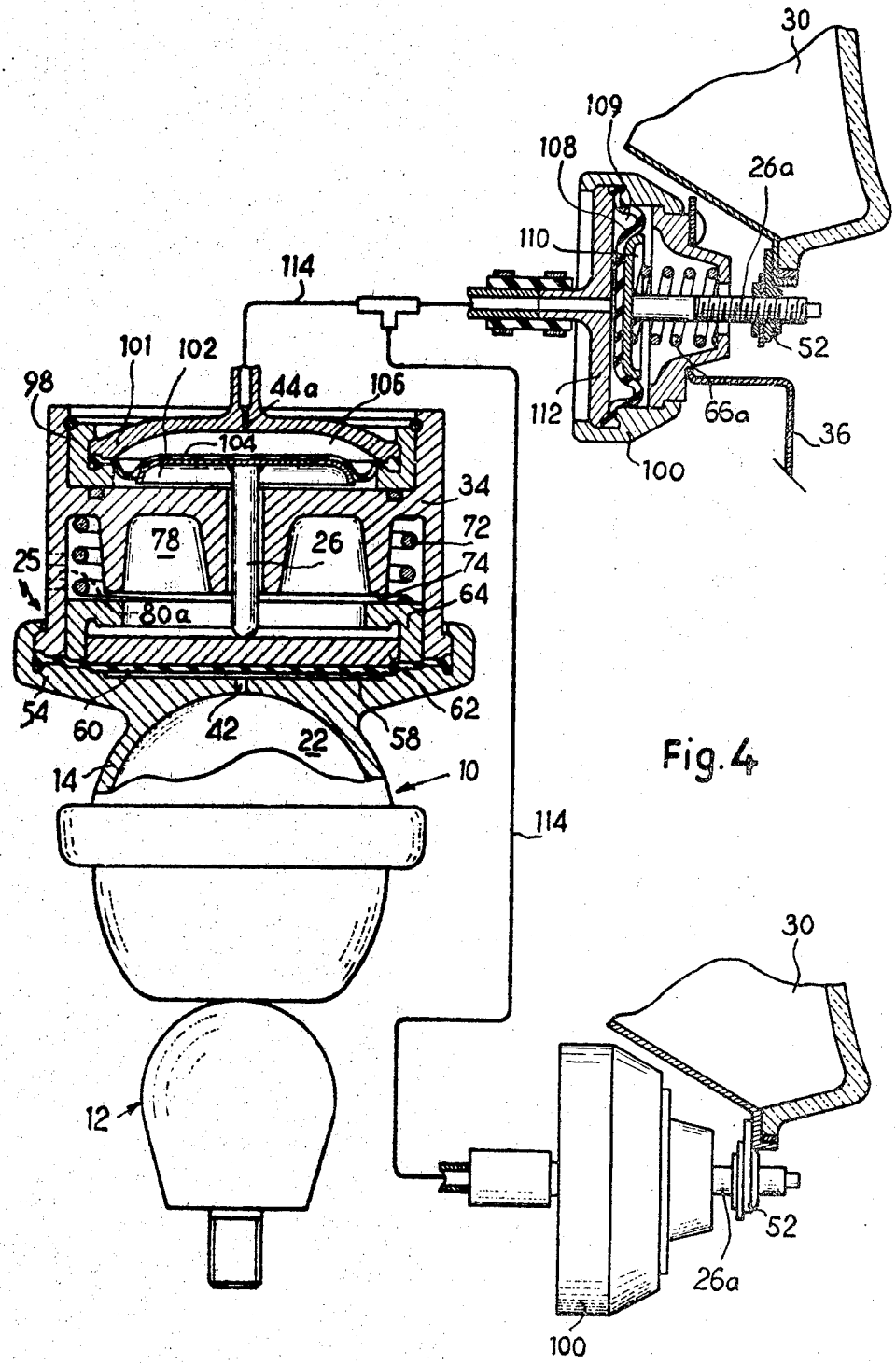
FIG. 4 is a diagrammatic view of a fluid embodiment of an automatic control system according to the invention.

The control system shown in FIG. 4 is substantially similar to the one described with reference to FIG. 3. The main difference consists of an hydraulic actuation by the actuator 25 of control member 26a instead of mechanical actuation defined hereinabove. To this end the control member 26 is connected to a plate 102 adapted to depress the central portion of an elastomeric diaphragm 104 the periphery of which is sealingly compressed between a cap 101 and an annular plug 98 secured to casing 34 this latter also defining the casing of actuator 25. The chamber 106 defined between cap 101 and diaphragm 104 is filled with hydraulic fluid such as oil and is connected to receiver cylinders 100. Each receiver cylinder comprises a piston 110 connected to control member 26a and resiliently urged by spring 66a in abutment against the central portion of a deformable diaphragm 108 the outer edge of which is sealingly compressed between the housing of cylinder 100 and a cap 112. The internal chamber 109 is connected to chamber 106 by transmitting conduits 114 though a restrictive flow area orifice 44a having the same damping action as the above-mentioned orifice 44. The operations of the systems shown in FIGS. 3 and 4 are the same as the one of the first embodiment described with reference to FIGS. 1 and 2.

I claim:

1. An automatic control system for controlling the angular position of the headlights of a vehicle according to the trim thereof, said system comprising actuator means operatively connected to the headlights to modify the angular position thereof according to a fluid differential control pressure supplied by control means as a function of the trim of the vehicle sensed by said control means characterized in that said actuator means comprise at least one pressure-responsive movable element operative to control the angular position of the headlights and adapted to be biased into one or the other of two stable balanced positions for each of which said element is provided with a predetermined effective area subjected to said fluid differential control pressure acting on said element against the force of preloaded resilient means, characterized in that said pressure-responsive movable element comprises a piston member which is resiliently urged toward a fixed annular shoulder for sealing engagement therewith to define a first effective area subjected to said differential control pressure, said piston member being adapted to be moved away from said shoulder for engaging an abutment spaced therefrom when the differential control pressure acting on said piston is above a first predetermined value, to provide a second effective area subjected to said differential pressure which is greater than said first area so that said piston member is maintained in engagement against said abutment as long as said fluid differential control pressure is above a second predetermined value lower than the first one.

2. An automatic control system according to claim 1, characterized in that said actuator means comprise a plurality of piston members which are coaxially arranged to be fitted in one another, each piston member being adapted when actuated by said differential control pressure to engage either a fixed abutment provided in the housing of said actuator means or the adjacent piston member having an effective area greater than the one of the first-named piston member.

3. An automatic control system for controlling the angular position of the headlights of a vehicle according to the trim thereof comprising fluid pressure differential control means responsive to the trim of the vehicle and actuator means having a housing and provided with at least one pressure-responsive movable element operatively connected to the headlights for modifying the angular position thereof according to the differential control pressure from said control means characterized in that said movable element includes an elastomeric cup sealingly secured at its periphery to the housing of said actuator means, the central portion of said cup being normally depressed by a movable piston element loaded by preloaded resilient means to sealingly engage a fixed annular shoulder provided in said housing.

4. An automatic control system according to claim 3 characterized in that each pressure responsive movable element is operative to control a hydraulic pressure controlling the position of spring-loaded piston means operatively connected to the headlights to angularly move the same.

5. An automatic control system according to claim 3 characterized in that said control means supplying said differential control pressure comprise at least one pneumatic piston-cylinder assembly the two relatively movable elements of which are connected to a fixed portion and to one axle respectively of the vehicle.

6. An automatic control system according to claim 3 characterized in that damping means including a restricted area orifice are provided between said control means and said actuator means.

7. In the combination comprising: a vehicle having a chassis, an axle, and at least one headlight; actuator means operatively coupled between the at least one headlight and the chassis to vary the angular positioning therebetween; control means interconnecting the chassis and the axle operative to sense variations in the trim of the vehicle; and fluid interconnection means operative to intercommunicate the control means and the actuator means whereby the angular positioning of the at least one headlight is varied in response to the variations in the trim of the vehicle; the improvement comprising movable wall means and wall means located within one of said control means and said actuator means and resilient means biasing said movable wall means into abutment with said wall means establishing a first position and recess means exposing a reduced portion of said movable wall means to a fluid pressure when said movable wall means is in said first position, said recess means operative to expose a larger portion of said movable wall means to the fluid pressure when said movable wall means is not in said first position.

8. The combination as claimed in claim 7 wherein said movable wall means comprise a plurality of nested pistons each of which is successively operative in cooperation with said recess means when in said first position to limit the area of said pistons exposed to the fluid pressure.

9. The combination as claimed in claim 7 wherein said one of said control means and said actuator means further include abutment means operative to limit travel of said movable wall means away from said first position cooperative with said wall means to define at least one second position such that the fluid pressure differential required to move said movable wall means from said first position to said at least one second position exceeds the fluid pressure differential required to permit movement of said movable wall means from said at least one second position to said first position.